US005626966A

United States Patent [19]

[11] Patent Number: 5,626,966

[45] Date of Patent: May 6, 1997

Külper et al.

[54] SINGLE-LAYER LASER LABEL

[75] Inventors: Klaus Külper, Pinneberg; Ralf Hirsch, Hamburg, both of Germany

[73] Assignee: Beiersdorf Aktiengesellschaft, Hamburg, Germany

[21] Appl. No.: 459,077

[22] Filed: Jun. 2, 1995

[30] Foreign Application Priority Data

Jun. 22, 1994 [DE] Germany .......................... 44 21 865.6

[51] Int. Cl.[6] .................................................... B32B 27/00

[52] U.S. Cl. .................... 428/423.1; 428/40.1; 428/42.3; 428/195; 428/204; 428/352; 428/488.4

[58] Field of Search ............................... 428/40, 43, 913, 428/914, 411.1, 40.1, 42.3, 195, 204, 352, 488.4; 283/101, 103, 105, 60

[56] References Cited

U.S. PATENT DOCUMENTS

| | | | |
|---|---|---|---|
| 4,064,390 | 12/1977 | Hildebrand et al. | 235/470 |
| 5,215,817 | 6/1993 | Chu | 428/330 |
| 5,290,067 | 3/1994 | Langen | 283/60.1 |
| 5,389,414 | 2/1995 | Popat | 428/40 |

FOREIGN PATENT DOCUMENTS

| | | |
|---|---|---|
| 0190997 | 8/1986 | European Pat. Off. . |
| 0198771 | 10/1986 | European Pat. Off. . |
| 3925563 | 2/1991 | Germany . |
| 4134271 | 12/1992 | Germany . |

OTHER PUBLICATIONS

J. Mvers, Modern Plastic International, vol. 23, No. 10, pp. 29–31, (1993).

*Primary Examiner*—William Krynski

*Attorney, Agent, or Firm*—Sprung Horn Kramer & Woods

[57] ABSTRACT

Single-layer laser label comprising a a) backing layer of plastic, which b) contains an additive which changes color under laser irradiation and which c) is coated on one side with a self-adhesive composition which d) is optionally covered with a release paper or a release film.

5 Claims, No Drawings

SINGLE-LAYER LASER LABEL

The invention involves single-layer, self adhesive, two-dimensional structures, referred to in general as labels, which can be written on and marked with lasers, especially solid-state or $CO_2$ lasers, with the desired contrast between base support and writing being produced by colour change without or with minimal removal of material. The term labels in this context is also intended to denote signs, films, and the like.

BACKGROUND OF THE INVENTION

1. Field of the Invention

The inscription and marking of materials by means of laser is widespread; it involves the removal of material. In the case of uniform material it constitutes etching; if, however, a thin top layer of different colour is removed, then high-contrast inscriptions can be obtained, as is the case in the production of frontplates in day-and-night design for car radios. Similar techniques are also known for two-dimensional structures such as signs and labels. Two-dimensional laser-inscribable materials of this kind are distinguished by a two-layer or multilayer construction comprising thin top layers and thick base layers, with the individual colour layers being intended to exhibit maximum contrasts.

2. Description of the Prior Art

In accordance with DE U 81 30 861, the coating layers consist of solvent-free, electron beam-cured coating materials which are applied in succession. The resulting film material is provided with an additional layer of adhesive. The high-quality two-layer or multi-layer film material is distinguished by high temperature resistance, weathering resistance and chemical resistance. By means of the laser beam it is possible to remove the top layer selectively and, owing to the colour contrast of the base layer, a readily visible inscription (letters, numbers, symbols, logos, etc.) is produced.

DE 41 34 271 describes the production of a composite material comprising two coloured coating layers of different colours, with at least the top layer which is to be subjected to laser being applied by the transfer method. An advantage stated here is the high uniformity which can be achieved in layer thickness.

In DE 39 25 563, a composite material comprising a glass fibre mat and a black PTFE coating is used as base material for flexible, temperature- and chemical-resistant product labels which can be written on by means of laser.

All of the above multilayer systems are characterized by a complex method of production—in addition to the production of the base support, which is usually a film, it is necessary in a second operation to apply an appropriate top layer which is different in colour. For reproducible, well-defined inscriptions, stringent requirements must be placed on the layer thickness tolerances which requirements, especially in the case of coating techniques such as for DE U 81 30 861, imply apparatus of considerable complexity and restrict productivity. In many cases, interlaminar adhesion between the successively applied layers constitutes a weak point—only by using special production techniques and/or additives in the formulations is it possible to improve the bond strength to such an extent that the material can be employed even for high-performance applications.

In the two-layer systems mentioned above, an inscription is obtained by removing the upper layer, termed the top layer. Given an appropriate choice of the materials for the polymer structure and of the colours/pigmenting of the top and base layers, it is possible to obtain high contrast and high definitions of inscription. The supply of highly concentrated electromagnetic radiation, mostly in the infrared region, leads to a discharge of material at the point where the laser beam impinges, in the form of aerosols. For reasons of workplace safety the area where laser inscription is carried out has to be exhausted and even, where possible, isolated; the exhaust air is generally cleaned by way of particle filters and absorption filters in order to prevent pollution of the environment with in some cases toxic splitting and elimination products.

The object of the invention was to remedy this state of affairs, and in particular to provide a laser label of simple construction from which the disadvantages of the prior art are absent or in which they are at least reduced, but which nevertheless possesses advantageous properties in use.

SUMMARY OF THE INVENTION

The invention relates accordingly to a single-layer laser label comprising a a) backing layer of plastic, which b) contains a additive which changes colour under laser irradiation and which c) is coated on one side with a self-adhesive laser composition which d) is optionally covered with a release paper or a release film.

Using such labels it is possible to obtain results, for inscription and the like with a laser, which could not have been foreseen by the person skilled in the art. In particular, it is not possible to achieve comparable results using the two-layer labels which have been customary up to now.

DESCRIPTION OF PREFERRED EMBODIMENTS

Suitable additives are, in particular, colour pigments and metal salts, especially copper hydroxide phosphate or Iriodin, a pearl lustre pigment as commercially obtainable from the company Merck. These additives are mixed into the base polymer (as described for example in U 81 30 861), in particular in the order of magnitude of a few parts per thousand to a maximum of 10 percent. After the production of two-dimensional material by known processes such as extrusion, casting, coating etc. followed optionally by radiation-chemical crosslinking, such films are coated with self-adhesive compositions which must be tailored to the subsequent application. Covering with siliconized release paper then produces the typical construction of preliminary material from which labels can be manufactured.

Suitable support layers are composed of plastics such as polyesters, poly(meth)acrylates, polycarbonate and polyolefins, and radiation-curable systems such as unsaturated polyesters, epoxy acrylates, polyester acrylates and urethane acrylates as are also employed for UV printing inks, and especially those composed of a base polymer according to DE U 81 30 816, namely aliphatic urethane acrylate oligomers.

Appropriate self-adhesive compositions are commercially available but are also described in the literature, for instance in DE C 15 69 898.

When standard lasers are employed, specifically the widespread Nd-YAG solid-state lasers having a wavelength of 1.06 μm, a more or less marked change in colour takes place at the point where the laser impinges on the surface of the material, and well-defined, high-contrast inscriptions and marks are obtained. In addition to a significant simplification in production of the films, a further positive aspect which results is that the inscription rate can be increased, in some cases considerably. Where it has been necessary beforehand to vaporize a 5–25 μm thick top layer and discharge it as an aerosol, for the novel inscription method the quantity of energy which need be employed is smaller, which, for a given laser output, permits an increase in the inscription rate.

Furthermore, the fact must not be disregarded that, in comparison with the previous removal methods, this method of inscription and marking must be adjudged as being more favourable in ecological terms. In the standard method the top layer is removed as an aerosol (gaseous, liquid or in the form of solid particles); as with every thermal method, it is also possible for splitting products to be formed. Owing to the hazard posed by substances which are objectionable from the point of view of workplace hygiene (irritation of the airways, solid particles entering the lungs, etc.), isolation with air exhaustion and the use of special filters are necessary. In addition to the capital costs required, proper disposal of filters contaminated in this way is increasingly giving rise to ever greater problems and costs as well. With the new technology of colour change, by contrast, the emission which takes place is zero or only minimal thus considerably reducing the safety precautions which need be taken: either special filters are not necessary, or the replacement times for the filters are extended considerably.

For the production of the laser-inscribable films as well, the invention displays distinct advantages over the prior art: the abandonment of the two-layer construction does away with the need to manufacture a (thin) top layer on which, specifically, the most stringent requirements with regard to uniformity of layer thickness are placed—the production methods chosen can be very much more economic and harder.

For most applications of a two-layer label the bond strength between the base layer and the top layer must be high: especially in the case of commercial security labels an attempt to scratch off the layer leads to the destruction of the entire bond. Furthermore, a high bond strength is an absolute necessity in the case of laser treatment if well-defined contours and high information densities (e.g. bar codes) are to be obtained: when the material is subjected to thermal machining the top layer flakes off in coarse fragments if the interlaminar adhesion is inadequate, and leads to frayed contours and/or the destruction of fine lines in bar codes, and therefore to loss of information. With a homogenous single-layer construction, such problems can be ruled out from the outset.

Surprisingly, in the course of the inscription of labels according to the invention it has been found that the line width which is achieved in the material by laser treatment is significantly smaller, while retaining high contour definition, than in the case of the two-layer systems—this opens up the possibility of accommodating a greater quantity of information in a limited space and therefore of following the trend towards miniaturization.

In the text below the invention is illustrated with reference to examples, but without the desire to restrict the said invention unnecessarily.

EXAMPLE 1

In accordance with DE U 81 30 861, the radiation-curing coating material is prepared from 90% of a commercial polyurethane acrylate and 10% of HDDA (hexanediol diacrylate). 0.5% of the copper hydroxide phosphate additive known from DE 39 17 294 is incorporated with vigorous stirring. The paste is applied to a high-gloss biaxially oriented polyester film with a uniform thickness of 60 μm and is cured under inert gas by an electron beam (EB): coating with a known polyacrylate contact adhesive in a layer thickness of 25 μm is followed by covering with commercial white silicone paper. The auxiliary support (polyester film) is then removed.

In the course of inscription and marking with a Nd-YAG solid-state laser at the wavelength of 1.06 μm, in the region of laser treatment the originally transparent film is coloured dark grey to anthracite. The resolution is so great that strokes from a height of 2/10 mm can be reproduced with good definition and in some cases can only be read with the aid of a magnifying glass. In contrast to the two-layer systems, in this case the surface of the original film has undergone zero or minimal damage.

EXAMPLE 2

Especially for the automatic reading of bar codes, a high light-dark contrast is required. For this purpose a white film is prepared which contains, in addition to the constituents specified in Example 1, up to 40% of $TiO_2$ and 10% of reactive diluent in order to bring about a processable viscosity; the addition of 5% of copper hydroxide phosphate produces films which on laser treatment display a high contrast between the film and text/bar code—reliable readability with automatic scanners is ensured.

EXAMPLE 3

Instead of the high-quality radiation-cured polyurethane acrylate films according to Examples 1 and 2, it is also possible to develop self-adhesive films which are based on standard plastics with suitable additives: the coating of films which are produced from the doped polybutylene terephthalate (PBT—Vestodur®X 7060 from Hüls), coated with commercial contact adhesives and then covered with silicone paper results in sign and label materials which, when treated with a Nd-YAG solid-state laser, can be marked/inscribed in a rapid and flexible manner. Here too, the high contour definition and small line width allows a high information density. Given appropriate setting of the laser parameters, the surface is altered to a minimal extent or not at all.

EXAMPLE 4

If the formulation of Example 2 contains 5% of the pearl lustre pigment Iriodin® 100 from the company Merck instead of the copper hydroxide phosphate and is subjected to radiation-chemical curing, then inscriptions using a $CO_2$ laser at a wavelength of 10.6 μm produce medium-grey strokes which are suitable for markings and labelling. The contrast can be intensified by reducing the proportion of titanium dioxide in the initial formulation.

We claim:

1. Single-layer laser label comprising a
   a) backing of an electron beam-cured polyurethane acrylate coating material, which
   b) contains an additive that causes color changes from originally light, pale to dark under laser irradiation and which
   c) is coated on one side with a self-adhesive composition which d) is optionally covered with a release paper or a release film.

2. Single-layer laser label according to claim 1, wherein the additive is copper hydroxide phosphate or a pearl luster pigment.

3. Single-layer laser label according to claim 1, wherein a pigment is used in addition to the additive titanium dioxide.

4. Single-layer laser label according to claim 1, wherein the backing layer has a thickness of from 10 to 200 μm, in particular from 50 to 100 μm.

5. Single-layer laser label according to claim 1, wherein the additive is employed in quantities of from 0.1 to 10% by weight, in particular from 0.5 to 5% by weight, based on the overall weight of the backing layer.

* * * * *